US011521100B1

(12) United States Patent
Arora et al.

(10) Patent No.: US 11,521,100 B1
(45) Date of Patent: Dec. 6, 2022

(54) SYSTEMS AND METHODS FOR CUSTOMIZING A PROCESS OF INFERENCE RUNNING

(71) Applicant: Palantir Technologies Inc., Palo Alto, CA (US)

(72) Inventors: Megha Arora, Palo Alto, CA (US); Samuel Szuflita, Brooklyn, NY (US); Hao Dang, Redmond, WA (US); Mihir Patil, Cupertino, CA (US); Yeong Wei Wee, London (GB); Alice Yu, San Francisco, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 543 days.

(21) Appl. No.: 16/667,820

(22) Filed: Oct. 29, 2019

Related U.S. Application Data

(60) Provisional application No. 62/862,505, filed on Jun. 17, 2019.

(51) Int. Cl.
*G06F 21/00* (2013.01)
*G06N 7/00* (2006.01)
*G06F 21/54* (2013.01)

(52) U.S. Cl.
CPC ............. *G06N 7/005* (2013.01); *G06F 21/54* (2013.01); *G06F 2221/033* (2013.01)

(58) Field of Classification Search
CPC .... G06F 2221/033; G06F 21/54; G06N 7/005
USPC .......................................................... 706/48
See application file for complete search history.

(56) References Cited

U.S. PATENT DOCUMENTS

| | | | |
|---|---|---|---|
| 10,523,754 B2 * | 12/2019 | Tenzer | H04L 41/0803 |
| 2005/0114288 A1 * | 5/2005 | Dettinger | G06F 16/2428 |
| 2008/0144859 A1 * | 6/2008 | Boss | G05B 15/02 381/107 |
| 2010/0223223 A1 * | 9/2010 | Sandler | G06F 16/683 706/50 |
| 2012/0054777 A1 * | 3/2012 | Xiques | H04N 21/431 719/318 |
| 2019/0230242 A1 * | 7/2019 | Minami | G06F 16/116 |
| 2020/0042893 A1 * | 2/2020 | Hunt | G16H 10/00 |

* cited by examiner

*Primary Examiner* — Josnel Jeudy
(74) *Attorney, Agent, or Firm* — Sheppard Mullin Richter & Hampton LLP

(57) ABSTRACT

Systems and methods are provided for processing an input dataset or running an inference. The systems and methods may be configured to accept an input dataset, access one or more predefined logic plugins for processing the input dataset, process the input dataset based at least in part on a first predefined logic plugin, and generate the one or more outputs based at least in part of the processing of the input dataset. The one or more outputs may have a different format than a format of the input dataset.

15 Claims, 9 Drawing Sheets

300D

SYSTEMS AND METHODS FOR CUSTOMIZING A PROCESS OF INFERENCE RUNNING

TECHNICAL FIELD

This disclosure relates to approaches for data processing. In particular, this disclosure relates to processing various datasets using customizable logic to generate various types of outputs.

BACKGROUND

Under conventional approaches, machines can take input data, apply predefined logic to the data, and generate output data. In some instances, such conventional approaches may not be adapted for running inferences of customized processes with user defined logic. Additionally, such conventional approaches may be inadequate when a user wishes to generate an output that is different in format from an input dataset.

SUMMARY

Various embodiments of the present disclosure can include systems, methods, and non-transitory computer readable media configured to accept an input dataset, access one or more predefined login plugins for processing the input dataset, wherein a first predefined logic plugin of the one or more predefined login plugins is configured to process the input dataset based on logic specified by the first predefined logic plugin to generate one or more outputs that are different from the input dataset, process the input dataset based at least in part on the first predefined logic plugin, and generating the one or more outputs based at least in part on the processing of the input dataset, wherein the one or more outputs have a different format than a format of the input dataset.

In some embodiments, a format of the one or more outputs comprises one of an issue, a schema, a typeclass inference, an ontology mapping, or an application of security controls on the input.

In some embodiments, the systems, methods, and non-transitory computer readable media are further configured to perform determining whether a portion of the input dataset satisfies a criterion of the first predefined logic plugin, and generate the portion of the input dataset determined to satisfy the criterion as the one or more outputs.

In some embodiments, the determining whether the portion of the input dataset satisfies a criterion of the first predefined logic plugin comprises determining whether a probability that the portion satisfies a criterion exceeds a first threshold; determining that the portion satisfies a criterion in response to the probability being determined to exceed the first threshold; and determining that the portion does not satisfy a criterion in response to the probability being determined not to exceed the first threshold.

In some embodiments, the systems, methods, and non-transitory computer readable media are further configured to set the first threshold based on a cost of erroneously failing to determine that the portion satisfies the specified criteria.

In some embodiments, the systems, methods, and non-transitory computer readable media are further configured to perform: searching a first section of the data to determine whether an entry of the first section satisfies a criterion of the first predefined logic plugin; in response to determining that the entry of the first section satisfies the criterion, skipping remaining entries of data in the first section without searching for another entry that satisfies the specified criterion; and returning the entry as the one or more outputs generated.

In some embodiments, the systems, methods, and non-transitory computer readable media are further configured to perform: monitoring a time interval during which the input dataset is being processed; monitoring a duration of the processing of the input dataset; or monitoring a current status of the processing of the input dataset.

In some embodiments, the systems, methods, and non-transitory computer readable media are further configured to perform: setting a security feature based on the output.

In some embodiments, the systems, methods, and non-transitory computer readable media are further configured to perform: determining whether the processing the input dataset conflicts with another process; and in response to determining that the processing the input dataset conflicts with another process, determining whether to process the input dataset.

In some embodiments, the determining whether the processing the input dataset conflicts with another process is based on a type of a process of processing the input dataset.

In some embodiments, the processing the input dataset further comprises:
setting a priority of the processing of the input dataset; and processing the input dataset based on the set priority, a logical dependency, or in response to an output of a previous process.

In some embodiments, the systems, methods, and non-transitory computer readable media are further configured to perform: determining whether the first predefined logic plugin is valid; and in response to the first predefined logic plugin determined to not be valid, correcting the first predefined logic plugin or not uploading the first predefined logic plugin until the first predefined logic plugin is determined to be valid.

These and other features of the systems, methods, and non-transitory computer readable media are disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention(s).

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention(s) are utilized, and the accompanying drawings of which:

DETAILED DESCRIPTION

Figure 1:
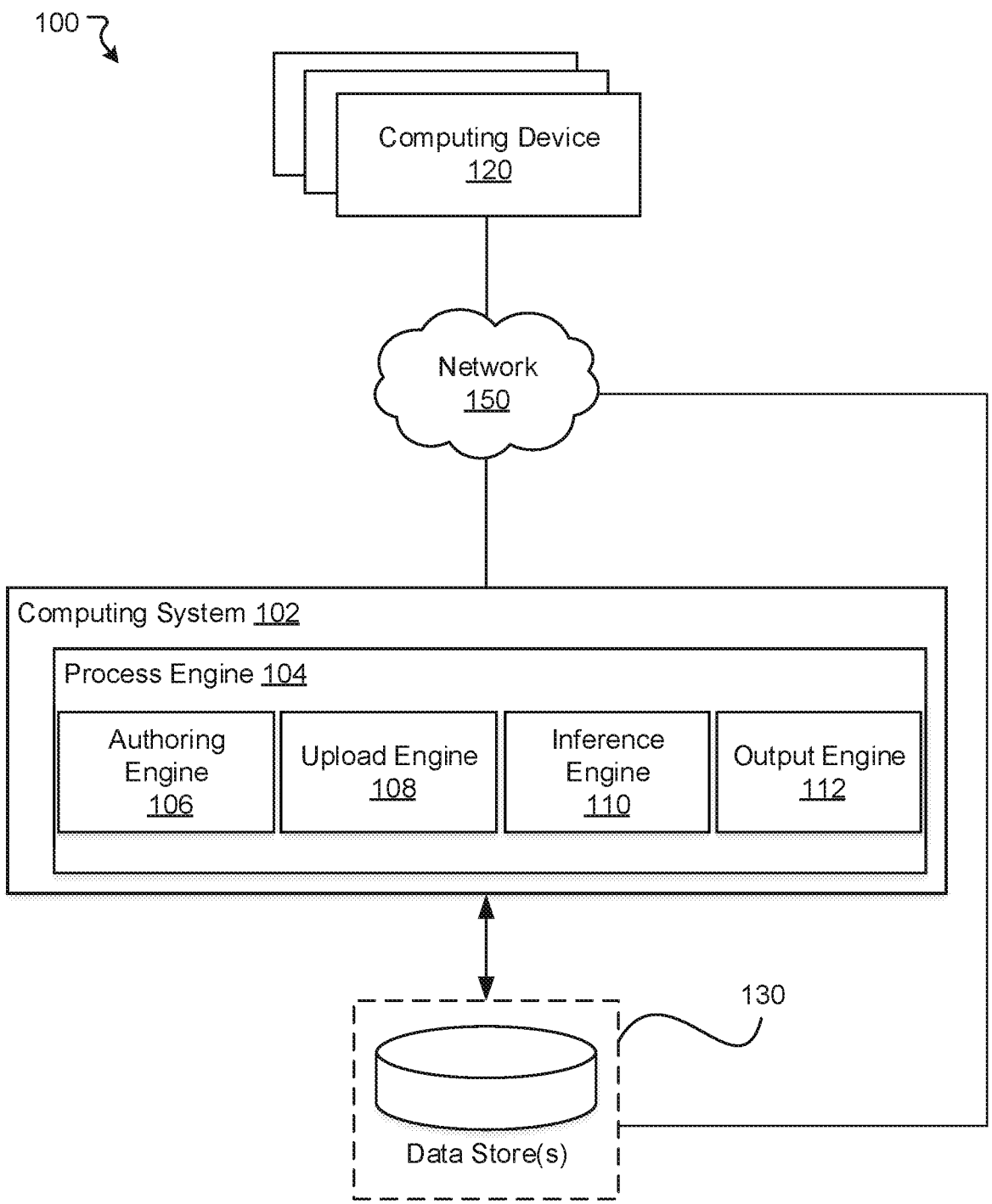
FIG. 1 depicts a diagram of an example of a system, in accordance with various embodiments.

A claimed solution rooted in computer technology overcomes problems specifically arising in the realm of computer technology. In various embodiments, a system may accept an input dataset, access one or more predefined logic plugins for processing the input dataset, process the input dataset based at least in part on a first predefined logic plugin of the one or more predefined logic plugins, and generate one or more outputs based at least in part on the processing of the input dataset. At least one of the one or more outputs may have a different format than a format of the input dataset. The system may accept the input dataset manually or automatically. The one or more predefined logic plugins may comprise logic that may be defined by a user. Prior to the predefined logic plugin being uploaded, a validity of the predefined logic plugin may be determined. For example, the system may determine whether the predefined logic plugin is buggy, or whether the predefined logic plugin is compatible with a format of the input dataset. For example, the system may use debugging code to test the validity of predefined logic plugin. If the system determines that the predefined logic plugin is invalid, the system may debug or correct the predefined logic plugin, and/or prevent use of the predefined login plugin until the predefined logic plugin is determined to be valid. After the predefined logic plugin is uploaded, the system may further add preprocessing code and/or post processing code to the predefined logic plugin to enable the processing of the input dataset. The predefined logic plugin, along with other predefined logic plugins, may be stored and made available for use across a platform upon which the system resides. After the system runs the predefined logic plugin, an output generated upon running the predefined logic plugin may be in a same format or a different format than a format of the input dataset. For example, the format or formats of the one or more outputs may comprise one or more of an issue, a schema, a typeclass inference, an ontology mapping, or an application of security controls on the input. As an example, the predefined logic plugin may comprise or be associated with code, such as regular expressions, that can be executed to recognize personally identifiable information (PII). PII may include social security numbers, driver's license numbers, or other personal information that may be used to identify an individual. In this example, upon executing the predefined logic plugin, the system may determine that a portion of the input dataset satisfies criteria specified by the predefined logic plugin. The criteria could include characteristics that identify the portion of the input dataset as PII, or potential PII. The system can then output the portion of the input dataset that satisfies the specified criteria. The criteria may be defined as one or more regular expressions, keywords, or categories, for example. If the system determines that a portion of the input dataset contains PII, the system may generate an issue and/or an alert. Furthermore, the system may set or apply a security feature based on the issue. For example, the system may delete, redact, or restrict access to the portion of the input dataset containing the PII. As another example, the system may run multiple processes associated with multiple predefined logic plugins for processing the input dataset. The system may determine whether a process conflicts with other processes. For example, the determination of whether a process conflicts with other processes may be made based on a type of the process. As an example, the system may determine that two processes conflict because they are both schema inference processes. If the system determines that the process conflicts with other processes, the system may not allow the conflicting processes to run together, or, may allow the conflicting processes to run depending on the embodiment. If the system allows the conflicting processes to run together, the system may select a result from one of the processes with a highest precedence. If, during execution of the processes, the system determines an existence of a conflict, the system may output a conflict in the format of an issue or an issue notification. Many variations are possible.

FIG. 1 illustrates an example environment 100, in accordance with various embodiments. The example environment 100 may include at least one computing system 102 that includes one or more processors and memory. The processors may be configured to perform various operations by interpreting machine-readable instructions. In some embodiments, the example environment 100 may be implemented as a data platform. In some embodiments, the example environment 100 may be configured to interact with computing systems of the data platform. In various embodiments, computing systems of the data platform may receive and process queries to identify a column or columns of data sets that satisfy criteria specified by a predefined logic plugin.

In some embodiments, the computing system 102 may include a process engine 104. The process engine 104 may include an authoring engine 106, an upload engine 108, an inference engine 110, and an output engine 112. The process engine 104 may be executed by the processor(s) of the computing system 102 to perform various operations including those operations described in reference to the authoring engine 106, the upload engine 108, the inference engine 110, and the output engine 112. In general, the process engine 104 may be implemented, in whole or in part, as software that is capable of running on one or more computing devices or systems. In one example, the process engine 104 may be implemented as or within a software application running on one or more computing devices (e.g., user or client devices) and/or one or more servers (e.g., network servers or cloud servers). In some instances, various aspects of the authoring engine 106, the upload engine 108, the inference engine 110, and the output engine 112 may be implemented in one or more computing systems and/or devices. The environment 100 may also include one or more data stores 130 accessible to the computing system 102. The data stores 130 may be accessible to the computing system 102 either directly or over a network 150. In some embodiments, the data stores 130 may store data that may be accessed by the process engine 104 to provide the various features described herein. In some instances, the data stores 130 may include federated data stores, databases, or any other type of data source from which data may be stored and retrieved, for example. In some implementations, data stores 130 may include various types of data sets on which predefined logic plugins can be applied to identify various types of data and generate various outputs. In general, a user operating a computing device 120 can interact with the computing system 102 over the network 150, for example, through one or more graphical user interfaces and/or application programming interfaces.

The authoring engine 106 may be configured to provide an interface, such as a graphical user interface or an application programming interface, for a user to create one or more predefined logic plugins for various processes. In some embodiments, a predefined logic plugin can be composed of code or instructions for processing datasets. The code can specify functions (or instructions) for identifying various types of data and/or metadata as well as operations to perform or outputs to generate when such data and/or metadata is identified. For example, the predefined logic plugin can be created to identify personally identifiable information (PII). The predefined logic plugin can also be created to output an issue, infer a schema, convert a format of a file, infer a typeclass, or perform an ontology mapping, to name some examples. The authoring engine 106 may provide a platform for the user to create the predefined logic plugin. The authoring engine 106 may further determine whether the predefined logic plugin is valid. For example, the authoring engine 106 may determine whether the predefined logic plugin is invalid or whether the predefined logic plugin is compatible with a format of the input dataset. If the authoring engine 106 determines that the predefined logic plugin is invalid, for example, due to bugs, the authoring engine 106 may debug or correct the predefined logic plugin and/or prevent use of the predefined login plugin until the predefined logic plugin is determined to be valid.

After the user completes the creation of the predefined logic plugin at the authoring engine 106, the upload engine 108 may transmit the predefined logic plugin to a repository. The upload engine 108 may further publish the predefined logic plugin to the repository or a second repository. The upload engine 108 may further register the predefined logic plugin and/or one or more artifacts associated with predefined logic plugins with the inference engine 110.

The inference engine 110 may be configured to accept an input dataset for processing. The inference engine 110 may download or access a predefined logic plugin stored in the repository, and download any other plugins, such as other predefined logic plugins, protocols, or job specifications, as needed to process the input dataset. For example, a user may submit a request through the interface to apply one or more predefined logic plugins to the input dataset. In this example, the inference engine 110 may access and run the predefined logic plugins on the input dataset. The inference engine 110 may further run pre-processing code, end user plugin code, and/or post processing code associated with the predefined logic plugins. In some embodiments, pre-processing code, the end user plugin code, and/or the post processing code may be specifically tailored to a predefined logic plugin. The inference engine 110 may be configured to process the input dataset based at least in part on the predefined logic plugins. Such processing can involve analyzing the input dataset based on criteria specified in a predefined logic plugin, for example. To determine whether a portion of the input dataset satisfies a criterion of a predefined logic plugin, the inference engine 110 may determine a probability that the portion satisfies the criterion. If the probability exceeds a first threshold, the inference engine 110 may determine that a portion satisfies the criterion. Otherwise, if the probability does not exceed the first threshold, the inference engine 110 may determine that the portion does not satisfy the criterion. Alternatively, the first threshold may be set based on a cost of erroneously failing to determine that the portion satisfies the specified criteria. As an example, if the predefined logic plugin is configured to identify personally identifiable information (PII), the inference engine 110 may determine a probability that a portion of the input dataset does contain PII. The first threshold may then be set based on a cost or risk in an event that an actual PII entry is not detected. In some embodiments, the inference engine 110 may stop processing of the input dataset once the inference engine 110 determines a single entry that satisfies the criterion, for example, a single entry of a social security number. In some embodiments, the inference engine 110 may search a first section of data to determine whether an entry in the first section satisfies the criterion. If the inference engine 110 determines that an entry in the first section satisfies the criterion, the inference engine 110 may stop processing the first section of the input dataset, and skip remaining entries not yet searched in the first section. The inference engine 110 may generate the entry that satisfies the criterion as an output, and/or generate an issue or an alert.

In various embodiments, the inference engine 110 may generate one or more outputs based at least in part on the processing of the input dataset. The one or more outputs can include a copy of the input dataset in a format that is different from an original format of the input dataset. Some example types of outputs can include an issue alert (or notification), a schema inference, a file conversion, a typeclass inference, and an ontology mapping, as described below. The inference engine 110 may, based on the outputs generated, provide instructions to the output engine 112.

For example, as mentioned, in some embodiments, the inference engine 110 may be configured to identify predefined types of information, such as personally identifiable information (PII), in an input dataset and output an issue notification if the inference engine 110 identifies the predefined types of information. In such embodiments, the inference engine 110 may be configured to identify predefined types of information, e.g., PII, in the input dataset, based at least in part on execution of a predefined logic plugin. For example, the inference engine 110 may determine whether a portion of the input dataset satisfies at least one criterion of the predefined logic plugin. The inference engine 110 may determine whether a portion of the input dataset satisfies at least one criterion of the predefined logic plugin based on a format and/or a type of the input dataset. For example, the inference engine 110 may determine that a portion of the input dataset satisfies at least one criterion if any portion of the input dataset comprises a string, a string having a specific length, or a sequence of strings separated by dashes or other characters. For example, the predefined logic plugin can be associated with code, such as regular expressions, that can be executed to recognize social security numbers based on a format of the social security numbers. For example, the predefined logic plugin may be associated with code that recognizes social security numbers follow a consistent format having a string with nine numerals, or three numerals followed by a dash, followed by two numerals, followed by a dash, and ending with four numerals. The predefined login plugin may also recognize social security numbers as including a format having nine numerals, even if some of the dashes are missing. The portion of the input dataset determined to satisfy the criterion may be generated as an output by the inference engine 110. In response to the inference engine 110 determining that there is a portion of the input dataset satisfying at least one criterion, the inference engine 110 may generate an issue and/or an alert and implement one or more security features. For example, the one or more security features may comprise restricting access to data (e.g., entries) in the input dataset that corresponds to personally identifiable information, locking such data, deleting the data, and/or issuing an alert to the user regarding the data.

In some embodiments, the inference engine 110 may be configured to perform a schema inference and file conversion. In such embodiments, the inference engine 110 may be configured to perform a schema inference and/or a file conversion on the input dataset, based at least in part on execution of a predefined logic plugin. For example, the input dataset may comprise columns associated with a schema. The inference engine 110 may infer a schema by inferring a relationship between data entries within each of the columns and between the columns. For example, the inference engine 110 may infer that a first column of the input dataset comprises names of people by recognizing a common format of all entries in the first column. The inference engine 110 may infer names as having a format of a first string indicating a first name, followed by a space, and a second string indicating a last name. In another example, the inference engine 110 may infer names as having a format of a first string, followed by a space, followed by a character indicating a middle initial, followed by a space, and ending with a second string. The inference engine 110 may infer that a second column of the input dataset comprises gender information of each of the entries of the first column. For example, the inference engine 110 may infer gender as comprising formats such as, "F," "M," "male," or "female." The inference engine 110 may infer that a third column of the input dataset comprises information of a social security number corresponding to each of the entries of the first column, for example, by inferring a format of a social security number. During file conversion, the inference engine 110 may be configured to convert a format of the input dataset to a standard format, such as an industry standard format.

In some embodiments, the inference engine 110 may be configured to perform a typeclass inference. In such embodiments, the inference engine 110 may be configured to perform typeclass inference on the input dataset, based at least in part on the predefined logic plugin. For example, the input dataset may comprise columns. The inference engine 110 may infer a type of data in each of the columns. As an example, the inference engine 110 may infer that a first column comprises a string type, a second column comprises a string type, and a third column comprises a boolean type. The inference engine 110 may infer that a column having values of zeros and ones, or trues and falses, as comprising a boolean type. In some embodiments, the inference engine 110 may be configured to perform one or more inferences extending beyond primitive types to more sophisticated data types, such as classes, interfaces, and arrays, as well.

In some embodiments, the inference engine 110 may be configured to generate or perform an ontology mapping. In such embodiments, the inference engine 110 may be configured to generate or perform an ontology mapping on the input dataset based at least in part on the predefined logic plugin. The predefined logic plugin may comprise functions that map the input dataset to ontology objects and/or attributes. The inference engine 110 may run the functions on the input dataset and register a result comprising a mapping inferred by the functions. As an example, the inference engine 110 may be configured to map a first column of the input dataset, if the first column comprises names, to a "person" object; map a second column of the input dataset, if it contains gender information, to a "gender" attribute associated with the person object; and map a third column of the input dataset, if it contains social security numbers, to a "SSN" attribute associated with the person object. Many variations are possible.

In some embodiments, the inference engine 110 may further be configured to monitor a time interval during which the input dataset is being processed, monitor a duration of the processing of the input dataset, and/or monitor a current status of the processing of the input dataset. The inference engine 110 may provide information of the time interval, the duration, and/or the current status to the user.

In some embodiments, the inference engine 110 may further be configured to manage the processing of the input dataset based on a predefined logic plugin with respect to other processes associated with other predefined logic plugins. For example, the inference engine 110 may determine whether the processing the input dataset conflicts with another process. If the processing conflicts with another process, the inference engine 110 may not process the input dataset, delay processing of the input dataset, or process the input dataset without delay. If the process and the another process are run simultaneously, an issue may be generated in an event of a conflict. The inference engine 110 may detect a conflict, for example, based on an output that would be generated by the process and the another process, or based on a type of the process and a type of the another process. For example, if the process and the another process are of a same type, two processes of the same type may not be allowed to run simultaneously. The inference engine 110 may further set a priority of the processing of the input dataset and process the input dataset based on the set priority, with respect to other processes. The inference engine 110 may further process the input dataset based on a logical dependency with another process, or in response to an output from a previous process. For example, the inference engine 110 may run two processes together that are logically dependent on each other, such as schema inference and issue generation. For example, a schema inference process may identify entries having, or potentially having, personally identifiable information (PII). After outputting the identified entries having the PII, an issue generation process may generate issues if entries having PII are identified, and implement one or more security features based on the generated issues. For example, the one or more security features may comprise restricting access to the identified entries, locking the identified entries, deleting the identified entries, and/or issuing an alert to the user regarding the identified entries.

After the inference engine 110 processes an input dataset and generates one or more outputs of the input dataset, the inference engine 110 may provide instructions to the output engine 212 to display or otherwise communicate the one or more generated outputs to the user. As an example, the output engine 112 may display the one or more generated outputs in a format different from that of the input dataset. For example, the one or more outputs may be in a format of an issue, a schema, a typeclass inference, or an ontology mapping. An issue may comprise one or more portions, or one or more entries of the input dataset, that satisfy a criterion of the predefined logic plugin. As another example, a schema may comprise relational information within each column of the input dataset, and/or between the columns of the input dataset. As another example, a typeclass inference may identify a type, a class, or other identifying information of an entry. As another example, an ontology mapping may comprise relational information between the input dataset and another dataset. In some embodiments, one or more outputs generated by the inference engine 110 and displayed by the output engine 112 may be fed back to the inference engine 110 as an input dataset for another round of processing.

The output engine 112 may be configured to provide an interface, such as a graphical user interface or an application programming interface, through which information can be visualized and accessed. For example, such information can include one or more outputs generated, a graphical representation of the one or more outputs generated, or statistical information. For example, the interface may be provided by a software application, such as an application or web browser, running on a computing device 120 and through a display screen of the computing device 120. The interface may provide users with the ability to submit search queries, view search results, filter the search results, select one or more columns, view data within data sets, view one or more graphical representations, and view statistical information, to name some examples. More details describing the output engine 112 will be provided below in reference to FIG. 2. More details describing the graphical representations are provided below in reference to FIGS. 3A-3D.

Figure 2:
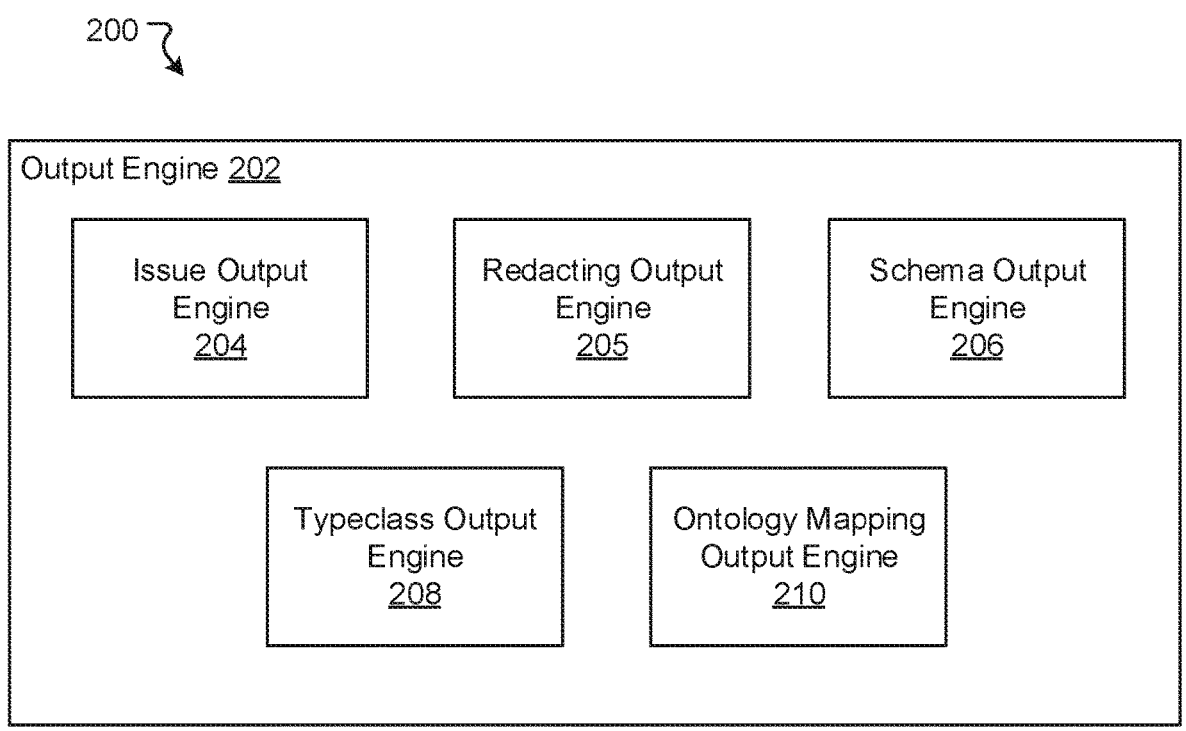
FIG. 2 depicts a diagram of an output engine, in accordance with various embodiments.

FIG. 2 illustrates an example output engine 202, in accordance with various embodiments. In some embodiments, the output engine 202 may be implemented as output engine 112 in FIG. 1. The output engine 202 may include sub-engines such as an issue output engine 204, a redacting engine 205, a schema output engine 206, a typeclass output engine 208, and an ontology mapping output engine 210. In some embodiments, the output engine 202 may be configured to process multiple output types, simultaneously or at different times. In some examples, the output engine 202 may determine a requested output type, or be provided information or instructions regarding the requested output type (e.g., from the inference engine 110), and provide instructions to or manage any of the appropriate sub-engines to display or communicate the requested output type. In some examples, the output engine 202 may instruct the issue output engine 204 to output one or more issue notifications. In other examples, the output engine 202 may instruct the redacting engine 205 to output information with certain identified data, such as PII, being redacted. In other examples, the output engine 202 may instruct the schema output engine 206 to output schemas having descriptive terms that indicate or describe a relationship between entries of an input dataset, columns of the entries, or within each of the columns of entries. In other examples, the output engine 202 may instruct the typeclass output engine 208 to output one or more typeclasses inferred from an input dataset. In other examples, the output engine 202 may instruct the ontology mapping output engine 210 to output information displaying a relationship or association that maps an input dataset to ontology objects and/or attributes. In other examples, the output engine 202 may simultaneously provide instructions to or manage multiple sub-engines to handle multiple output types.

In some embodiments, the output engine 202 may instruct the issue output engine 204 to output one or more issue notifications generated by the inference engine 110. For example, the issue output engine 204, when instructed by the output engine 202, may be configured to output an issue, alert, or notification. For example, the issue output engine 204 may be configured to output an alert that personally identifiable information (PII) was identified in an input dataset. As another example, the issue output engine 204 may output one or more entries that satisfy a criterion specified by a predefined logic plugin, created, for example, by a user at an authoring engine such as the authoring engine 106. As an illustrative example, the issue output engine 204 may be configured to output one or more entries determined, for example, to be information associated with a person's gender, social security number (SSN), and/or driver's license number. For example, the one or more entries may be determined to be PII based on a type and/or a format of the entries. In example 300A of FIG. 3A, an input dataset 302 may be provided to the output engine 202. The output engine 202 may receive instructions, for example, from the inference engine 110. The output engine 202 may receive information from the inference engine 110 that the input dataset 302 includes predefined restricted types of information, such as personally identifiable information, in a third column 304. The output engine 202 may provide instructions to the issue output engine 204 to generate an alert 306 indicating that restricted information was identified in Column 3 of the input dataset 302. In some embodiments, the output engine 202 may, simultaneously or at a different time, provide instructions to the redacting output engine 205 to redact one or more entries of a dataset that satisfy a criterion specified by a predefined logic plugin, as a security feature. As a result, the redacting output engine 205 may output a dataset 308 with the restricted information redacted.

Figure 3A:
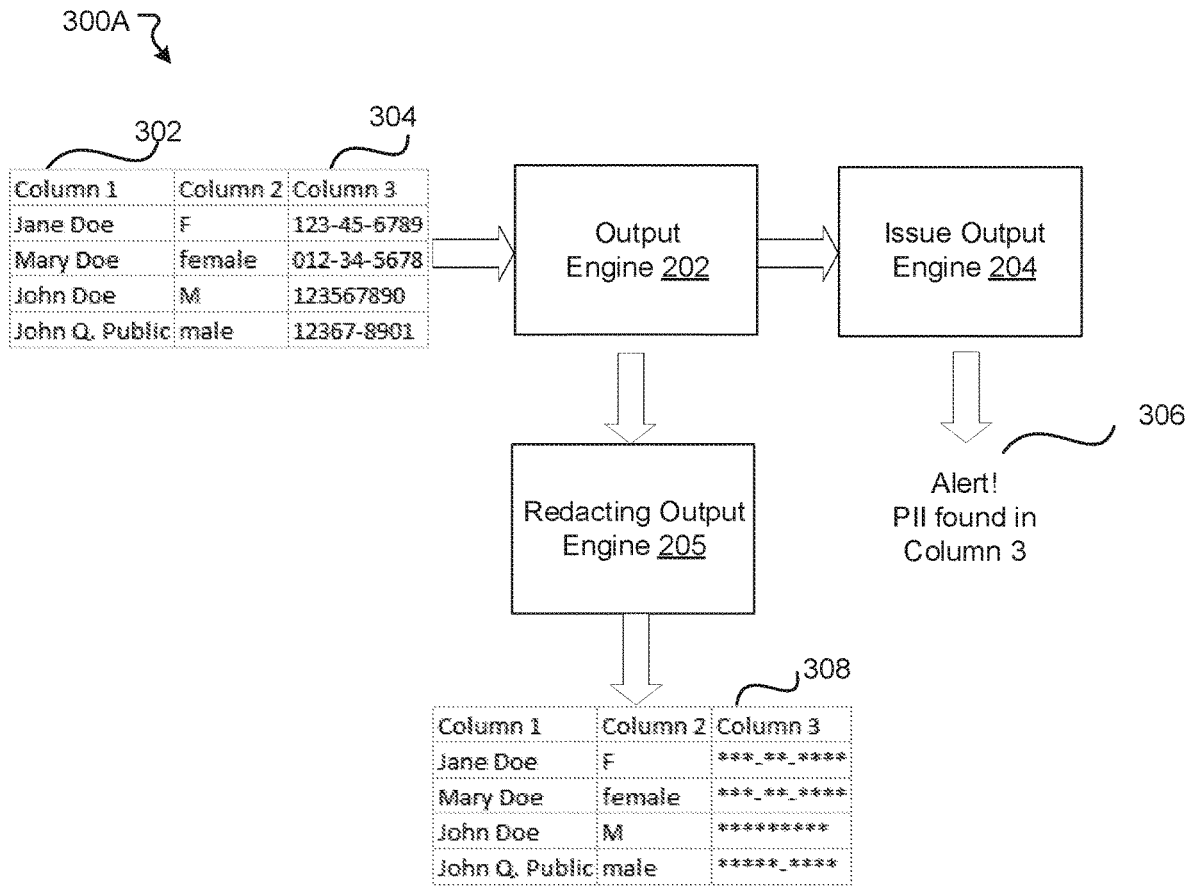
FIGS. 3A-3D illustrate example interfaces showing outputs in an output engine, in accordance with various embodiments.
Figure 3B:
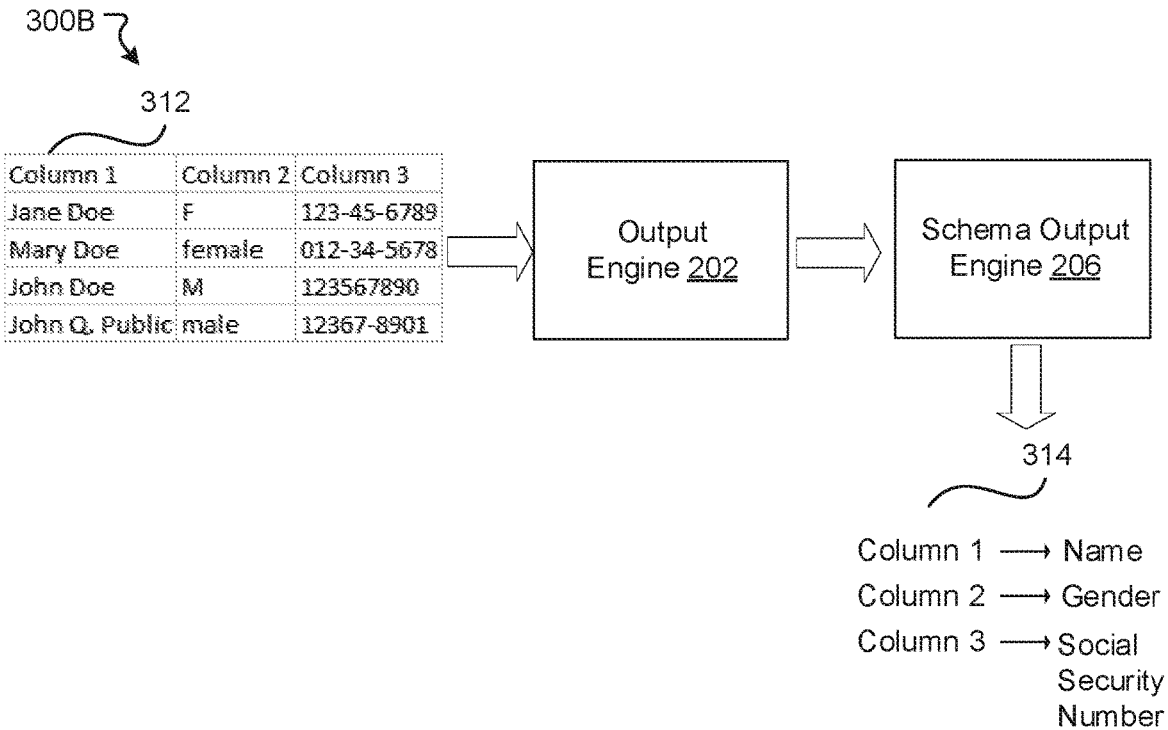
Figure 3C:
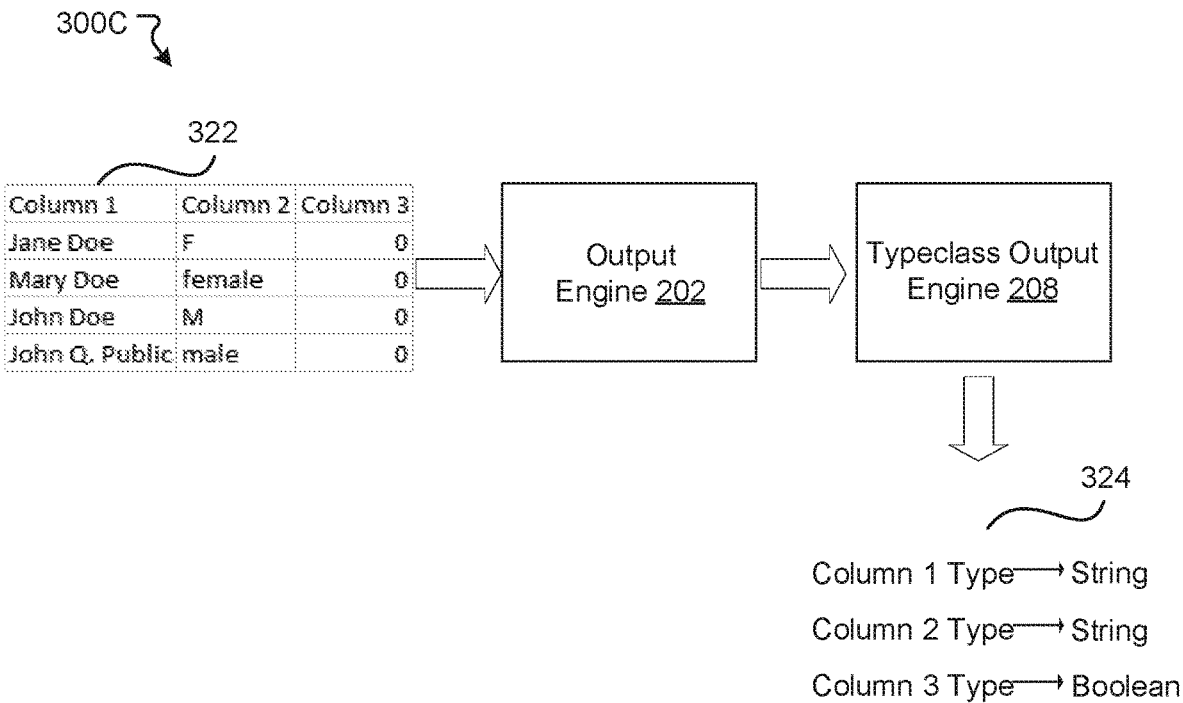
Figure 3D:
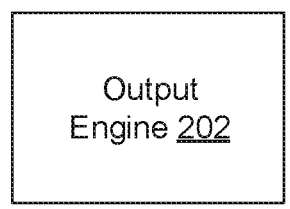
Figure 3D:
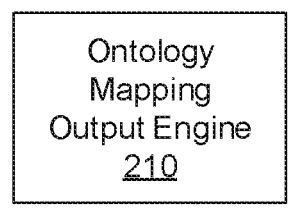
Figure 3D:
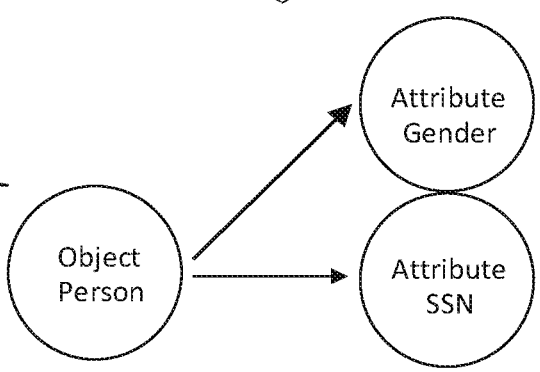

In some embodiments, the output engine 202 may instruct the schema output engine 206 to output schemas having descriptive terms that indicate or describe a relationship between entries of an input dataset, columns of the entries, or within each of the columns of entries. In example 300B of FIG. 3B, an input dataset 312 may be provided to the output engine 202. The output engine 202 may receive instructions, for example, from the inference engine 110. The output engine 202 may receive information from the inference engine 110 that the input dataset 312 includes a first column comprising names, a second column comprising gender information of the respective names, and a third column comprising social security number information of the respective names. The output engine 202 may provide instructions to the schema output engine 206 to output information 314 indicating that the first column of the input dataset 312 comprises names, the second column of the input dataset 312 comprises gender information of the respective names, and the third column of the input dataset 312 comprises social security number information of the respective names. In FIG. 3B, the first column is labelled as "Column 1," the second column is labelled as "Column 2," and the third column is labelled as "Column 3." A schema associated with the input dataset 312 may have been inferred, for example, by the inference engine 110, based on a type and/or a format of data entries in the input dataset 312. For example, the first column of the input dataset 312 may be inferred to comprise names based on a format of entries of the first column of the input dataset 312. For example, the entries of the first column may have a format of a first string indicating a first name, followed by a space, and a second string indicating a last name, or, alternatively, a first string, followed by a space, followed by a character indicating a middle initial, followed by a space, and ending with a second string. As an example, the second column of the input dataset 312 may be inferred to comprise gender information based on a type and/or a format of entries of the second column. For example, the entries of the second column may comprise entries such as, "F," "M," "male," or "female." As another example, the third column of the input dataset 312 may be inferred to comprise social security numbers based on a type and/or a format of entries of the third column. For example, the entries of the third column may comprise entries having a format of a social security number. Many variations are possible.

In some embodiments, the output engine 202 may instruct the typeclass output engine 208 to output one or more typeclasses inferred from an input dataset. As an illustrative example, the typeclass output engine 208 may be configured to output information to identify that entries associated with a given column correspond to a string type, boolean type, integer type, floating point number type, array type, object type, null, or a non-primitive type such as a class, interface, or array. As an example, the typeclass output engine 208 may be configured to output information that a name, gender, and social security number are string types, and information of whether an entry contains PII as a boolean type. In example 300C of FIG. 3C, an input dataset 322 may be provided to the output engine 202. The output engine 202 may receive instructions, for example, from the inference engine 110. The output engine 202 may receive information from the inference engine 110 that the input dataset 322 includes a first column comprising a string type, a second column comprising a string type, and a third column comprising a boolean type. The output engine 202 may provide instructions to the typeclass output engine 208 to output information 324 indicating that the first column of the input dataset 322 comprises a string type, the second column of the input dataset 322 comprises a string type, and the third column of the input dataset 322 comprises a boolean type.

In some embodiments, the output engine 202 may instruct the ontology mapping output engine 210 to output one or more ontology mappings. As an illustrative example, the ontology mapping output engine 210 may be configured to output information displaying a relationship or association that maps an input dataset to ontology objects and/or attributes. In example 300D of FIG. 3D, an input dataset 332 may be provided to the output engine 202. The output engine 202 may receive instructions, for example, from the inference engine 110. The output engine 202 may receive information from the inference engine 110 that the input dataset 332 includes a first column that maps to a "person" object 334, that a second column maps to a "gender" attribute associated with the person object 334, and that a third column maps to a "SSN (social security number)" attribute associated with the person object 334. The output engine 202 may provide instructions to the ontology mapping output engine 208 to output information 334 indicating that the first column maps to a "person" object 334, a second column maps to a "gender" attribute, and a third column maps to a "SSN" (social security number) attribute.

Figure 3E:
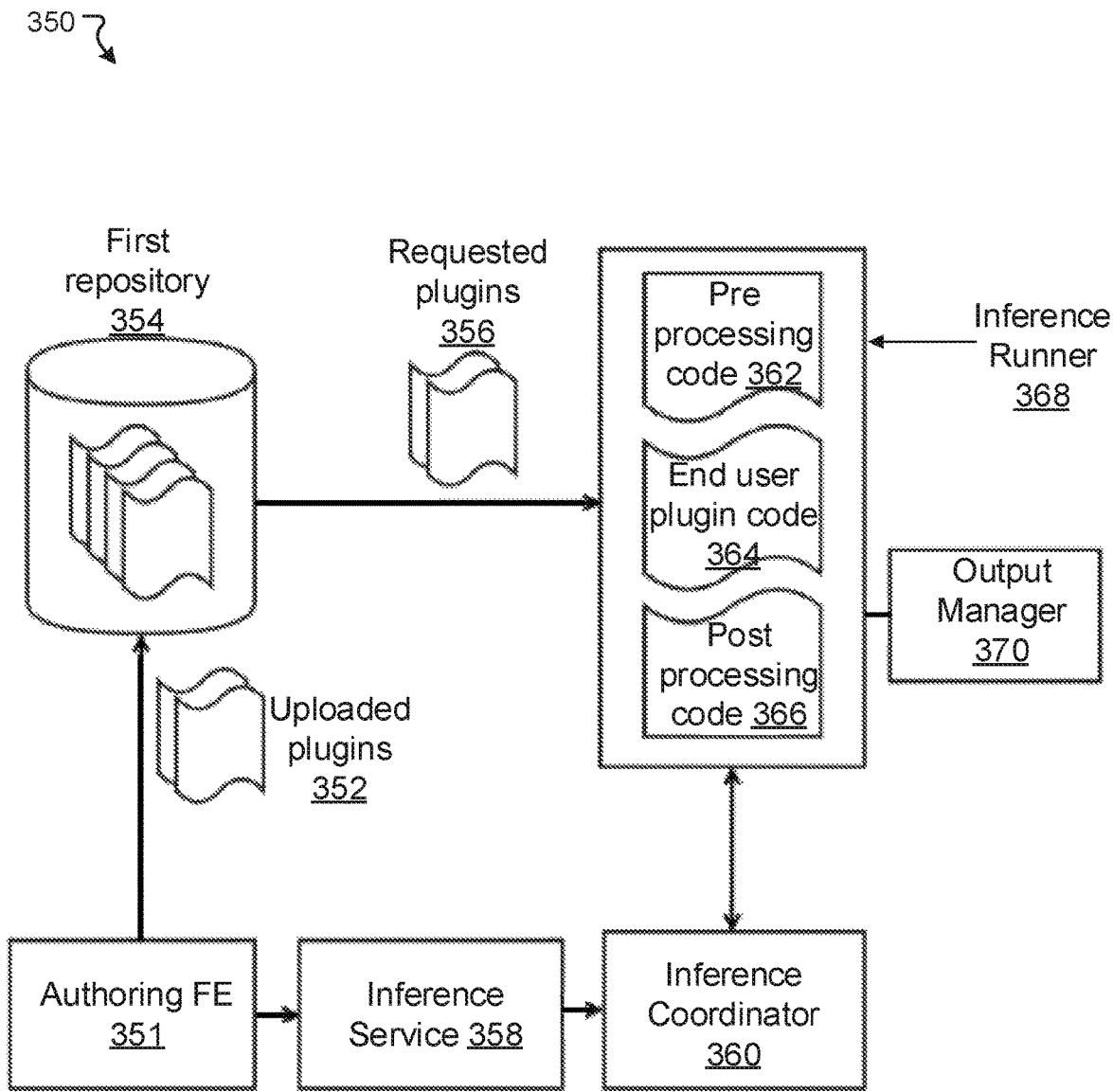
FIG. 3E depicts a process flow diagram, in accordance with various embodiments.

FIG. 3E depicts a process flow diagram 350, in accordance with various embodiments. For example, in FIG. 3E, an authoring FE 351 may be implemented as authoring engine 106 in some embodiments. For example, the authoring FE 351 may be configured to provide an interface, such as a graphical user interface or an application programming interface, for a user to create one or more predefined logic plugins for various processes. The authoring FE 351 may be configured to provide a platform for the user to write code or instructions for processing datasets. The code can specify functions for identifying various types of data and/or metadata as well as operations to perform or outputs to generate when such data and/or metadata is identified. The authoring FE 351 may determine whether the one or more predefined logic plugins are valid. For example, the authoring FE 351 may determine whether the one or more predefined logic plugins are invalid (e.g., buggy) or whether the one or more predefined logic plugins are compatible with a format of the input dataset. If the authoring FE 351 determines that the one or more predefined logic plugins are invalid, the authoring FE 351 may debug or correct the one or more predefined logic plugins, and/or prevent use of the one or more predefined logic plugins until the one or more predefined logic plugins are determined to be valid. After the one or more predefined logic plugins are created and validated at the authoring FE 351, the one or more predefined logic plugins may be uploaded to a first repository 354, and may be stored as uploaded plugins 352 in the first repository 354. The one or more predefined logic plugins may also be registered in an inference service 358. The inference service 358 may also store maven coordinates, compute references of functions included in the one or more predefined logic plugins, assemble job specifications to run a process with respect to a given input dataset, and dispatch the process to be run. An inference coordinator 360 may receive information from the inference service 358, compile data and resources to start the process, and request an inference runner 368 to run the process. The inference runner 368 may request some or all of the uploaded plugins 352 stored in the first repository 354. The requested plugins 356 may further be processed with preprocessing code 362, end user plugin code 364, and/or post processing code 366 at the inference runner 368. In some embodiments, the inference runner 368 may be implemented as inference engine 110. After the process is run, an output manager 370 processes an output or outputs of the process based on a workflow type. In some embodiments, the output manager 370 may be implemented as output engine 112.

Example Flowcharts of Process

Figure 4A:
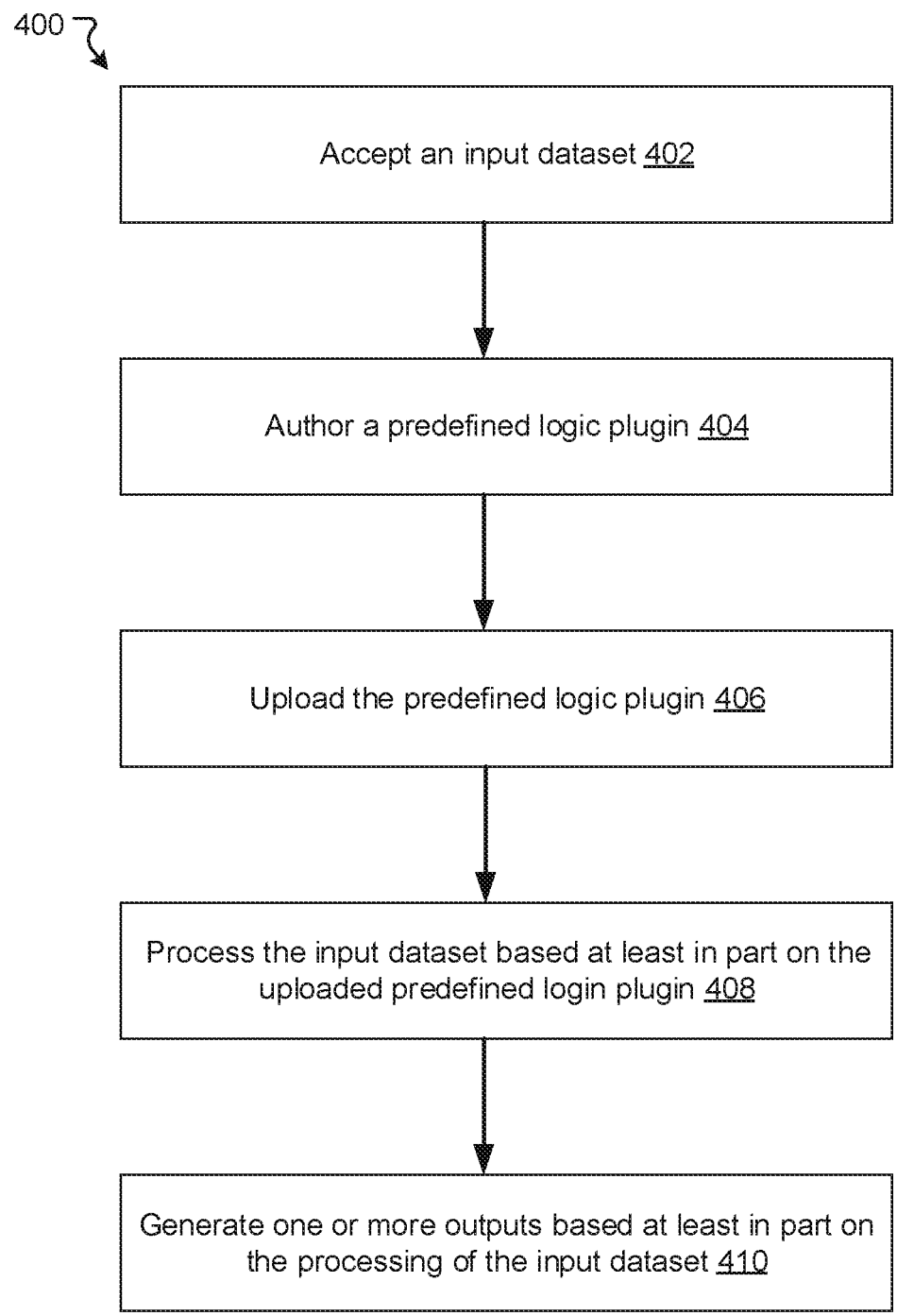
FIG. 4A depicts a flowchart of an example method, in accordance with various embodiments.

FIG. 4A depicts a flowchart of an example method 400 for data processing or inference running, in accordance with various embodiments. The operations of method 400 presented below are intended to be illustrative and, as such, should not be viewed as limiting. In some implementations, method 400 may be accomplished with one or more additional operations not described, and/or without one or more of the operations discussed. In some implementations, two or more of the operations may occur substantially simultaneously. The described operations may be accomplished using some or all of the system components described herein.

In an operation 402, method 400 may include accepting an input dataset. The input dataset may comprise different formats and/or types of data, or may comprise data that is uniform in format and/or type. In some implementations, operation 402 may be performed by a component the same as or similar to upload engine 108 (shown in FIG. 1 and described herein).

In an operation 404, method 400 may include authoring a predefined logic plugin. The predefined logic plugin may be authored by a user for the processing of the data or the inference running. The predefined logic plugin, for example, may include one or more criteria to identify whether a data entry, column, or portion of data is PII. In some implementations, operation 404 may be performed by a component the same as or similar to authoring engine 106 (shown in FIG. 1 and described herein).

In an operation 406, method 400 may include uploading the predefined logic plugin, for example, to a repository. The repository may include other logic plugins, protocols, or job specifications for the data processing or inference running. In operation 406, other logic plugins may also be uploaded. In some implementations, operation 406 may be performed by a component the same as or similar to upload engine 108 (shown in FIG. 1 and described herein).

In an operation 408, method 400 may include processing the input dataset based at least in part on the uploaded predefined logic plugin. For example, operation 408 may include identifying PII based at least on the one or more criteria of the uploaded predefined logic plugin. In some implementations, operation 408 may be performed by a component the same as or similar to inference engine 110 (shown in FIG. 1 and described herein).

In an operation 410, method 400 may include generating one or more outputs based at least in part on the processing of the input dataset. For example, operation 410 may include generating one or more outputs of PII, an alert or notification, a schema inference, typeclass inference, or ontology mapping of the input dataset. In some implementations, operation 410 may be performed by a component the same as or similar to output engine 112 (shown in FIG. 1 and described herein).

Figure 4B:
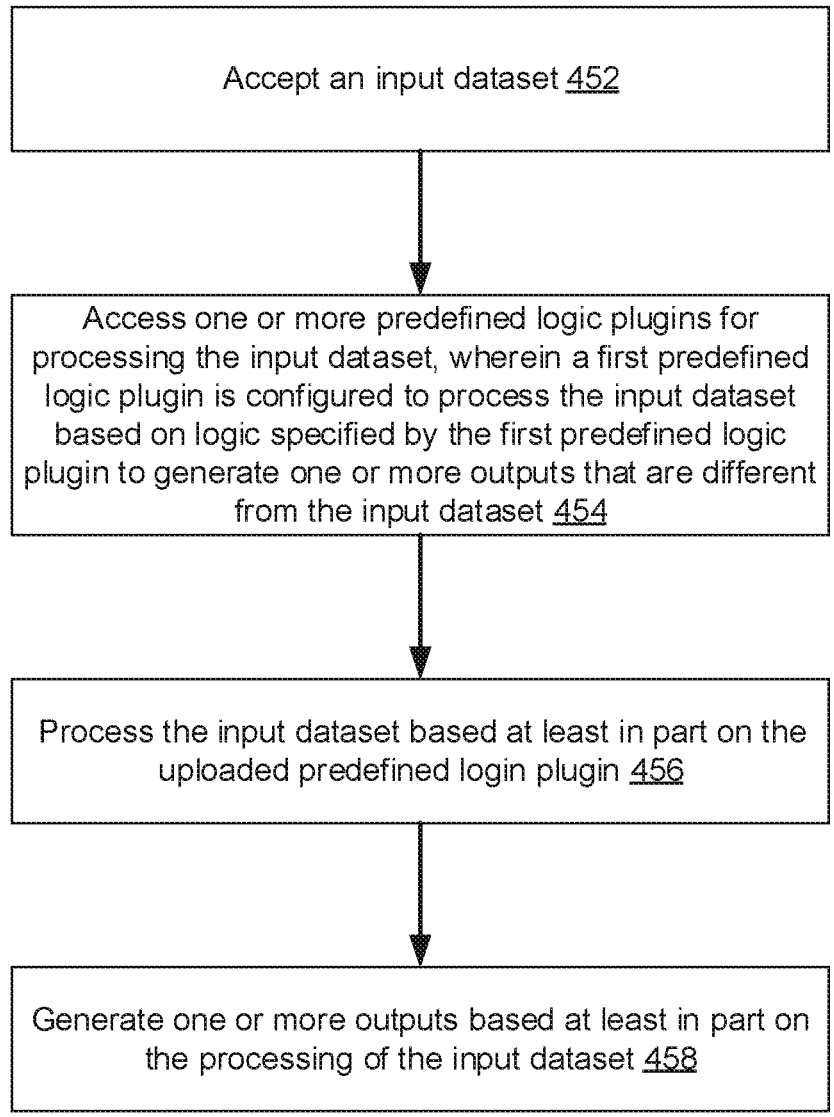
FIG. 4B depicts a flowchart of an example method, in accordance with various embodiments.

FIG. 4B depicts a flowchart of an example method 450 for data processing or inference running, in accordance with various embodiments. The operations of method 450 presented below are intended to be illustrative and, as such, should not be viewed as limiting. In some implementations, method 450 may be accomplished with one or more additional operations not described, and/or without one or more of the operations discussed. In some implementations, two or more of the operations may occur substantially simultaneously. The described operations may be accomplished using some or all of the system components described herein.

In an operation 452, method 450 may include accepting an input dataset. In an operation 454, method 450 may include accessing one or more predefined logic plugins for processing the input dataset, wherein a first predefined logic plugin is configured to process the input dataset based on logic specified by the first predefined logic plugin to generate one or more outputs that are different from the input dataset. In an operation 456, method 450 may include processing the input dataset based at least in part on the uploaded predefined logic plugin. In an operation 458, method 450 may include generating one or more outputs based at least in part on the processing of the input dataset.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
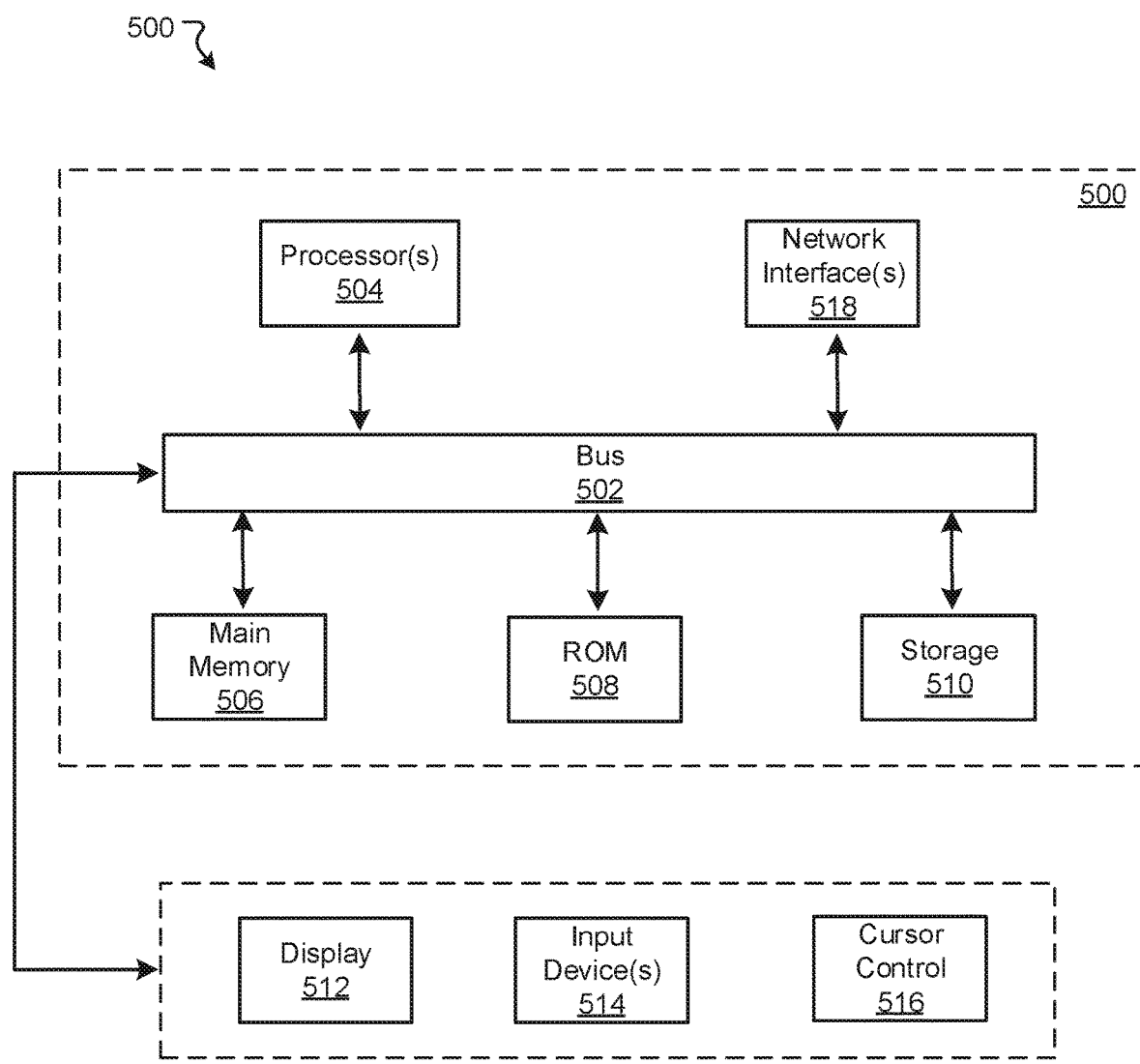
FIG. 5 depicts a block diagram of an example computer system in which any of the embodiments described herein may be implemented.

FIG. 5 depicts a block diagram of an example computer system 500 in which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media may also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer may load the instructions into its dynamic memory and send the instructions over a telephone line using a modem. A modem local to computer system 500 may receive the data on the telephone line and use an infra-red transmitter to convert the data to an infra-red signal. An infra-red detector may receive the data carried in the infra-red signal and appropriate circuitry may place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 may send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines may provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment may be combined with one or more features of any other embodiment.

Other implementations, uses and advantages of the invention will be apparent to those skilled in the art from consideration of the specification and practice of the invention disclosed herein. The specification should be considered to describe examples only, and the scope of the invention is accordingly intended to be limited only by the following claims.

What is claimed is:

1. A system comprising:
one or more processors; and
a memory storing instructions that, when executed by the one or more processors, cause the system to perform:
accepting an input dataset;
accessing one or more predefined logic plugins for processing the input dataset, wherein a first predefined logic plugin is configured to process the input dataset based on logic specified by the first predefined logic plugin to generate one or more outputs that are different in format from the input dataset;
determining whether a portion of the input dataset satisfies a criterion of the first predefined logic plugin, wherein the determination is based on whether a probability that the portion satisfies the criterion exceeds a first threshold, the first threshold being based on a cost or risk of erroneously failing to determine that the portion satisfies the criterion; and
based on the determination of whether the portion satisfies the criterion:
selectively processing the input dataset based at least in part on the first predefined logic plugin; and
selectively generating the one or more outputs based at least in part on the processing of the input dataset.

2. The system of claim 1, wherein a format of the one or more outputs comprises one of an issue, a schema, a typeclass inference, or an ontology mapping.

3. The system of claim 1, wherein, the instructions further cause the system to perform:
searching a first section of the data to determine whether an entry of the first section satisfies a criterion of the first predefined logic plugin;
in response to determining that the entry of the first section satisfies the criterion, skipping remaining entries of data in the first section without searching for another entry that satisfies the specified criterion; and
returning the entry as the one or more outputs generated.

4. The system of claim 1, wherein, the instructions further cause the system to perform:
monitoring a time interval during which the input dataset is being processed;
monitoring a duration of the processing of the input dataset; or
monitoring a current status of the processing of the input dataset.

5. The system of claim 1, wherein, the instructions further cause the system to perform:
setting a security feature based on the output.

6. The system of claim 1, wherein, the instructions further cause the system to perform:
determining whether the processing the input dataset conflicts with another process; and
in response to determining that the processing the input dataset conflicts with another process, determining whether to process the input dataset.

7. The system of claim 6, wherein the determining whether the processing the input dataset conflicts with another process is based on a type of a process of processing the input dataset.

8. The system of claim 1, wherein the processing the input dataset further comprises:
setting a priority of the processing of the input dataset; and
processing the input dataset based on the set priority, a logical dependency, or in response to an output of a previous process.

9. The system of claim 1, wherein the instructions further cause the system to perform:
determining whether the first predefined logic plugin is valid; and
in response to the first predefined logic plugin determined to not be valid, correcting the first predefined logic plugin or not uploading the first predefined logic plugin until the first predefined logic plugin is determined to be valid.

10. A method implemented by a computing system including one or more processors and storage media storing machine-readable instructions, wherein the method is performed using the one or more processors, the method comprising:
accepting an input dataset;
accessing one or more predefined logic plugins for processing the input dataset, wherein a first predefined logic plugin is configured to process the input dataset based on logic specified by the first predefined logic plugin to generate one or more outputs that are different from the input dataset;
determining whether a portion of the input dataset satisfies a criterion of the first predefined logic plugin, wherein the determination is based on whether a probability that the portion satisfies the criterion exceeds a first threshold, the first threshold being based on a cost or risk of erroneously failing to determine that the portion satisfies the criterion; and
based on the determination of whether the portion satisfies the criterion:
selectively processing the input dataset based at least in part on the first predefined logic plugin; and
selectively generating the one or more outputs based at least in part on the processing of the input dataset.

11. The method of claim 10, wherein a format of the one or more outputs comprises one of an issue, a schema, a typeclass inference, or an ontology mapping.

12. The method of claim 11, further comprising,
searching a first section of the data to determine whether an entry of the first section satisfies a criterion of the first predefined logic plugin;
in response to determining that the entry of the first section satisfies the criterion, skipping remaining sections of data without searching for another entry that satisfies the specified criteria; and
returning the entry as the one or more outputs generated.

13. The method of claim 10, further comprising:
determining whether the processing the input dataset conflicts with another process; and
in response to determining that the processing the input dataset conflicts with another process, determining whether to process the input dataset.

14. The method of claim 13, wherein the determining whether the processing the input dataset conflicts with another process is based on a type of a process of processing the input dataset.

15. The method of claim 10, wherein the processing the input dataset further comprises:
- setting a priority of the processing of the input dataset; and
- processing the input dataset based on the set priority, a logical dependency, or in response to an output of a previous process.

* * * * *